United States Patent [19]

Enomoto et al.

[11] Patent Number: 5,258,446
[45] Date of Patent: Nov. 2, 1993

[54] RESIN COMPOSITION

[75] Inventors: Masao Enomoto; Nobuo Ito, both of Kobe, Japan

[73] Assignees: Seikoh Chemicals Company, Limited, Kobe; Ajinomoto Company, Incorporated, Tokyo, both of Japan

[21] Appl. No.: 711,200

[22] Filed: Jun. 6, 1991

[30] Foreign Application Priority Data

Jun. 6, 1990 [JP] Japan .................................. 2-149140

[51] Int. Cl.$^5$ ........................ C08J 3/20; C08K 3/36; C08L 51/00
[52] U.S. Cl. ..................................... 524/538; 524/590
[58] Field of Search ................................. 524/538, 590

[56] References Cited

U.S. PATENT DOCUMENTS

| Re. 28,646 | 12/1975 | Hedrick et al. | 524/606 |
|---|---|---|---|
| 3,676,206 | 7/1972 | Nishitani et al. | |
| 3,914,479 | 10/1975 | Yamagata et al. | 428/290 |
| 3,932,359 | 1/1976 | Fujimoto et al. | 428/264 |
| 4,792,517 | 12/1988 | Klein et al. | 430/285 |

OTHER PUBLICATIONS

DataBase WPIL, 90-244386, & KR-A-8903171, Aug. 25, 1989.
DataBase, WPIL, 87-027005, & JP-A-61285268, Dec. 16, 1986.
DataBase WPIL, 90-211960, & JP-A-2139482, May 29, 1990.
DataBase WPIL, 91-069101, & JP-A-3017154, Jan. 25, 1991.
Japan Abstracts, JP-3-017154, Jan. 1, 1991, "Synthetic Resin Composition".

Primary Examiner—Paul R. Michl
Assistant Examiner—P. Niland
Attorney, Agent, or Firm—Oblon, Spivak, McClelland, Maier & Neustadt

[57] ABSTRACT

A surface finishing composition used for coating therewith a surface of an artificial leather or synthetic resin sheet or a surface of plastic product to provide the surface with the touch of suede, which comprises synthetic resin mainly composed of polyurethane resin, and powdered polyamino acid resin and silica which are dissolved or dispersed in an organic solvent. The finished surface is stronger against scratch, leaves less finger marks and provides better feel and appearance as compared with the prior art.

10 Claims, No Drawings

RESIN COMPOSITION

BACKGROUND OF THE INVENTION

This invention relates to a synthetic resin composition and, more particularly, to a composition used for coating therewith a surface of an artificial or synthetic leather sheet such as polyurethane or polyvinyl chloride leather sheet used for making bags, satchels, clothings, shoes and likes or a surface of shaped plastic product such as furniture, car interior components or casings of electric equipments to provide the surface with a superior mar resistance, natural fiber feeling, improved slipperiness and natural suede touch or feel.

Recently, synthetic resins for artificial leather have been actively developed and, especially, polyurethane and vinyl chloride resins are fequently used as a base material of artificial leather. However, the polyurethane resin is lacking in surface slipperiness and has some problem in mar resistance and machine workability (smoothness of sawing machine work) though it is superior in softness and strength of a coated film. While the vinyl chloride resin needs to use various plasticizers for adjusting softness, a bleeding effect due to a problem of mutual solubility of the resin and the plasticizers (such an effect in that the plasticizers bleed out of the coating surface with a lapse of time) results in a tacky surface which is lacking in slipperiness and has reduced feeling and touch as in the case of polyurethane resin. This problem of bleeding effect has not yet been solved regardless of many efforts paid for the study of various plasticizers. Although such a method as admixing a resin solution for artificial leather with fine particles of natural macromolecules such as casein, collagen and chitin delivatives has also been proposed this method cannot avoid unstable quality caused by these natural substances and conceives such problems as indispensability of complicated preliminary treatment for equalizing the quality and difficulty of finely powdering the large molecules.

On the other hand, various processing compositions have been proposed for finishing a surface of artificial leather or the like to provide it with a touch of suede. Such compositions of the prior art include (1) polyurethane resin composition containing fatty acid ester and silica, (2) polyurethane resin and acrylate resin composition containing dimethyl polysiloxane and silica and (3) polyurethane composition containing powdered polyethylene, polyethylene fluoride, polybutylene or silicon resin and silica. The compositions are coated on an objective surface by a gravure printing or spraying method to finish the surface to have a slippery natural suede touch.

However, the surface finished in this manner has suffered from such problems in that the coating is easily broken or deformed by nail scratch and that finger marks may be left on the coating by hand touch. Moreover, the coating exhibits undesirable tackiness.

Accordingly, an object of this invention is to provide a synthetic resin composition which can realize a feeling and a touch of natural leather.

Another object of this invention is to provide a novel and improved surface finishing synthetic resin composition which can form a suede touch coating which is strong against nail scratch, leaves no finger mark and has no tackiness and which has superior mar resistance, feeling and slipperiness.

SUMMARY OF INVENTION

According to an aspect of this invention, there is provided a synthetic resin composition for realizing a feeling and a touch of natural leather, comprising 100 parts by weight of resin for artificial leather and 0.5 to 40 parts by weight of powdered polyamino acid resin which are dissolved or dispersed in an organic solvent.

According to another aspect of this invention, there is provided a suede touch surface finishing synthetic resin composition comprising 100 parts by weight of synthetic resin containing polyurethane as its main ingredient, 5 to 50 parts by weight of powdered polyamino acid resin and 5 to 50 parts by weight of powdered silica, which are dissolved or dispersed in an organic solvent.

The above-mentioned resin for artificial leather includes resins containing polyurethane resin, vinyl chloride resin, acrylate resin and mixtures thereof as their main ingredients. The resin containing polyurethane as its main ingredient may include copolymer or mixture of polyurethane resin, polyurethane amino acid resin and polyurethane acrylate resin, and the polyurethane resin may include dry coating type polyurethane resins, wet coating-type polyurethane resin, emulsion type polyurethane urea resin foam-type polyurethane resin, polyurethane urea resin or polyurea resin which is preferably prepared by reaction of polyalkylene ether glycol having a molecular weight of 400 to 5,000 or polyesterpolyol, poly-ε-caprolactone-polyol or polycarbonate-diol or a mixture thereof with organic diisocyanate having hydrogen radicals at the ends thereof and, if desired, with extension of the chain using a compound having two active hydrogens.

The resin containing vinyl chloride resin as its main ingredient may include resin solutions of vinyl chloride resins of plasticizer addition type, paste type and foamed paste type, for example.

The powdered polyamino acid resin may be prepared from acidic amino acid ω-alkyl ester N-carboxy anhydride (N-carboxy anhydride will be hereinunder referred to as "NCA") given by a general formula:

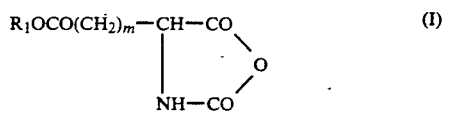 (I)

where $R_1$ is an alkyl radical of one to four carbons or

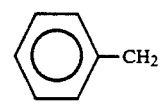

radical and m is 1 or 2, such as γ-methyl glutamate NCA, γ-ethyl glutamate NCA γ-benzyl glutamate NCA, β-methyl aspartate NCA, β-ethyl aspartate NCA or β-benzyl aspartate NCA or neutral amino acid NCA given by a general formula:

 (II)

where $R_2$ is an alkyl radical of three to eight carbons,

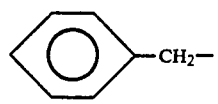

radical or $CH_3SCH_2\!-\!CH_2\!-$ radical, such as NCA of valine, norvaline, leucine, isoleucine, norleucine, phenyl alanine or methionine. Either optical active or racemic substances may be used and any mixture thereof may also be used.

The powdered polyamino acid resin preferably used in the inventive compositions may be prepared, for example, (1) by dispersing or dissolving the amino acid NCA given by the above-mentioned general formula I or II in an organic solvent, such as methylethyl ketone (MEK), ethyl ecetate, acetonitrile or toluene, which easily dissolve monomer thereof but does not dissolve polymer thereof, dropping therein a polymerization initiator having active hydrogens, such as amine compound, alcohol or water, together with tertiary amine as a catalyst if necessary, with agitation to cause them to react to obtain powdered polyamino acid resin dispersion and filtering and drying the dispersion, (2) by adding the above-mentioned polymerization initiator having active hydrogens in a sole mechanical flow of the above-mentioned amino acid NCA given by the general formula I or II to produce it directly, or (3) by dissolving the above-mentioned amino acid NCA given by the general formula I or II in an organic solvent such as 1,2-dichloroethane, dropping therein a polymerization initiator with agitation to prepare a polymer solution and mechanically powdering solid product obtained by removing the solvent from the solution. While the particle size of the powder can be controlled by controlling the amount of addition of the polymerization initiator, agitation speed, temperature or concentration of polymerization, or powdering condition, it may be 100 microns or less and, preferably, 20 microns or less, in this invention.

The powdered polyamino acid resin may be prepared also by previously mixing the resin solution for artificial leather with the amino acid NCA and polymerizing them. The product is referred to as "composite polyamino acid resin". More particularly, 0.5 to 40 parts by weight, as polyamino acid, of one or more amino acid NCA given by the general formula I or II is added in 100 parts by weight of resin solution for artificial leather and dissolved or dispersed uniformly therein and, thereafter, they are caused to react using as a polymerization initiator a compound having active hydrogens, such as amines, alcohols, thiols, hydrazine or water. It is desirable to use tertiary amine such as triethyl amine or tributyl amine as a catalyst at the time of using alcohol or water having low reaction activity. Although there is no special limitation in the reaction temperature, it is preferably 10° to 60° C. and, especially, 20° to 40° C. on account of reaction control. While smooth polimerization may be obstructed sometimes by difficulty of agitaton due to increased viscosity of the mixture caused during the reaction by some kind and content of the amino acid NCA, this problem can be solved by diluting the mixture with the solvent of the resin material for artificial leather. The resultant powdered composite polyamino acid resin has substantially the same effect as the aforementioned powdered polyamino acid resin and, also, it is most suitable for industrial production.

The degree of polymerization of the polyamino acid resin used in this invention is preferably above five units and, especially, above ten units when each amino acid is referred to as one unit. Below five unit, the feeling and touch of natural leather cannot be expected though the slipperiness of the surface is good.

The content of the powdered polyamino acid resin in the resin solution for artificial leather can be arbitrarily selected in accordance with the ability of product which is sought. In either case of polyurethane resin or vinyl chloride resin, no significant effect is obtainable below 0.5 part by weight for 100 parts by weight of the resin and the softness of artificial leather tends to be lost above 40 parts by weight. Accordingly, a range of 0.5 to 40 parts by weight is desirable, while a range of 5 to 30 parts by weight is especially desirable since it results in a product having a good balance in softness, feeling, slipperiness and likes. Although the resin solution may become unsuitable for working equipments such as application device by increase in its viscosity with the content of the polyamino acid resin above 10 parts by weight, this problem can be solved by diluting the solution with the solvent of the resin solution for artificial leather.

The organic solvent used in the inventive composition includes solvents of ether family such as dioxane, tetrahydrofulan and isopropyl ether, aromatic solvents such as benzene, toluene and xylene, solvents of ester family such as ethyl acetate and butyl acetate, solvents of ketone family such as methyethyle ketone, methylisobutyl ketone and cyclohexanone, solvents of amide family such as N,N-dimethyl formamide and N,N-dimethyl acetoamide and solvents of alcohol family such as ethanol, isobutyl alcohol and butanol, and these solvents may be used solely or as a mixture thereof.

In addition to the aforementioned gravure printing and spraying methods, the inventive composition can be applied to an objective surface by any method such as roller coating, reverse coating and doctor-blade coating.

On the other hand, the inventive suede touch surface finishing composition comprising the predetermined amounts of powdered polyamino acid resin and powdered silica mixed with a synthetic resin solution containing polyurethane resin as a main ingredient exhibits excellent pitch darkness when it is applied onto a black base. Moreover, it has been found that the coating is superior in mar resistance and withstands a cruel processing such as hot-pressing or hot-embossing without undesirable glossing effect. However, it should be noted that imperfection may be caused by the amount of each ingredient of the composition which comes out of the specific limit. Specifically, when the amount of powdered polyamino acid resin is less than 5 parts by weight, waxiness, anti-scratch strength and pitch darkness are insufficient and undesirable tackiness may appear. When this amount exceeds 50 parts by weight, the mar resistance will be reduced undesirably. When the amount of powdered silica which serves as a frosting or matting agent is less than 5 parts by weight, no satisfactory touch of natural suede can be obtained and, when it exceeds 50 parts by weight, the coated surface becomes whity and it undesirably whitens when folded.

DESCRIPTION OF PREFERRED EMBODIMENTS

Three kinds of polyurethane resin solution were prepared for use in the undermentioned embodiments, as follows. [U1] 2,000 parts by weight of butylene adipate having hydroxy radicals at both ends and a mean molecular weight of 2,000 was admixed with 500 parts by weight of 4,4'-diphenyl methane diisocyanate and caused to react for three hours at 70° C. Thereafter, 2,920 parts by weight of dimethyl formamide (DMF) and 2,920 parts by weight of methyl ethyl ketone (MEK) were added thereto and dissolved uniformly to obtain polyurethane resin solution U1 having a viscosity of 40,000 cps at 30° C..

[U2] 3,000 parts by weight of polycarbonate-diol having hydroxy radicals at both ends and a mean molecular weight of 2,000 was admixed with 524 parts by weight of 4,4'-dicyclohexyl methane diisocyanate and caused to react for two hours at 110° C., and 4,200 parts by weight of toluene was then added thereto and dissolved uniformly. Thereafter, 85 parts by weight of isophorone diamine was added thereto and caused to react at 40° C. and, upon completion of reaction, 4,200 parts by weight of sec-butyl alcohol was added to obtain polyurethane urea resin solution U2 having a viscosity of 30,000 cps at 30° C.

[U3] 132 parts by weight of polytetramethylene glycol having a mean molecular weight of 2,000, 48 parts by weight of polyethylene glycol having a mean molecular weight of 2,000, 13 parts by weight of ethylene glycol, 200 parts by weight of methyl ethyl kotone and 175 parts by weight of toluene were put in a polymerization container and, with agitation at 50° C., 71.3 parts by weight of 4,4'-diphenyl methane diisocyanate (MDI) was added and caused to react for 30 minutes. The temperature was then raised to 70° to 80° C. and reaction was continued for one hour. Thereafter, 0.1 part by weight of 10% toluene solution of dibutyl tin laurate was added as a catalyst and caused to react for one hour at the same temperature. As confirming residual isocyanate radicals by infrared absorption spectroscopy, 250 parts by weight of methyl ethyl ketone was added for dilution and, when the viscosity becomes 40,000 at 30° C., several drops of morpholine were added to stop the reaction to obtain polyurethane resin solution U3.

[A1] 100 parts by weight of γ-methyl L-glutamate N-carboxy anhydride (hereinunder referred to as "MG-NCA") was dissolved in 900 parts by weight of MEK at 30° C. and 1.4 parts by weight of dibutyl amine was dropped and caused to react for five hours at the same temperature to obtain MEK dispersion A1 of powdered poly-γ-methyl glutamate (PMG) having a mean particle size of 15 microns.

[A2] Commercially available 10% solution of poly-amino acid resin (tradename "Ajicoat A-2000" manufactured by Ajinomoto Co.) was applied onto a releasing paper and dried in a gear oven at 120° C. for one hour to remove its solvent. Thereafter, a resultant PMG film was peeled off from the releasing paper and finely cut by a cutter. Resultant PMG flakes were grounded into powder in a mortor with dry ice and then passed through a 200 mesh sieve to obtain powdered PMG A2.

[A3] 100 parts by weight of L-leucine NCA (hereinunder referred to as "Leu-NCA") was dissolved in 500 parts by weight of ethyl acetate at 30° C. and, at the same temperature, 0.15 part by weight of N,N-dimethyl-1,3-propane diamine was dropped therein and caused to react for three hours to obtain ethyl acetate dispersion of powdered P-Leu-NCA having a mean particle size of 10 microns.

[A4] 100 parts by weight of L-phenyl alanine NCA (hereinunder referred to as "Phe-NCA") was dissolved in 1,000 parts by weight of dichloroethane and, at 25° C., diethanol amine and triethyl amine having molar ratios 1/500 and 1/100, respectively, with respect to the Phe-NCA were added thereto and caused to react for five hours. Resultant precipitation of poly-L-phenyl alanine (hereinunder referred to as "P-Phe") was separated out by a centrifuge, dried at 40° C. at a reduced pressure and passed through a 200 mesh sieve to obtain 65 parts by weight of powdered P-Phe A4.

[A5] 100 parts by weight of Leu-NCA was dissolved in 1,000 parts by weight of acetonitrile and, then, ethylene diamine and triethyl amine of 1/1,000 and 1/100 molar ratios, respectively, with respect to the Leu-NCA were added thereto and caused to react for five hours. Resultant precipitation of P-Leu-NCA was separated by a centrifuge, dried at 40° C. at a reduced pressure and passed through a 200 mesh sieve to obtain 60 parts by weight of powdered P-Leu-NCA A5.

[A6] 40 parts by weight of MG-NCA, 40 parts by weight of Leu-NCA and 20 parts by weight of Phe-NCA were dissolved in 1,000 parts by weight of ethyl acetate and, then, N,N-dimethyl-1,3-propane diamine of 1/800 molar ratio with respect to the total molar number of these amino acid NCAs was added and caused to react at 30° C. for five hours. Resultant precipitation of polyamino acid was separated out by a centrifuge, dried at 40° C. at a reduced pressure and passed through a 200 mesh sieve to obtain 70 parts by weight of powdered polyamino acid A6.

EMBODIMENTS E1–E9

The resins U1 and U2 containing polyurethane as their main ingredient and the powdered polyamino acid resins A1, A2 and A3, which were prepared as above, were admixed respectively with powdered silica manufactured by Degussa Japan, Co. (tradename "OK-412") at ratios by weight as shown in Table 1 to obtain nine kinds of composition in total. Then, these compositions were added with MEK to adjust their solid component concentration to 15 percents by weight and dispersed enough by a sand mill to obtain respective coating compositions. Each composition was applied onto a black PVC leather and/or ABS resin sheet at a thickness of 30 grams per square meter by a gravure printer and the coating was dried at 120° C. for five minutes to obtain nine specimens for embodiment and four specimens for control as shown in Table 1.

The specimens were tested about waxiness, anti-scratch strength, finger mark, tackiness, pitch-darkness, Scott's abrasion, whitened fold and suede touch, respectively, and results were obtained as listed in Table 2.

TABLE 1

| | No. | Base Material | U1 | U2 | A1 | A2 | A3 | OK-412 |
|---|---|---|---|---|---|---|---|---|
| Embodiment | E1 | PVC leather | 100 | 0 | 20 | 0 | 0 | 30 |
| Embodiment | E2 | " | 100 | 0 | 0 | 20 | 0 | 30 |
| Embodiment | E3 | " | 0 | 100 | 20 | 0 | 0 | 40 |
| Embodiment | E4 | " | 0 | 100 | 0 | 20 | 0 | 40 |
| Embodiment | E5 | " | 100 | 0 | 20 | 0 | 0 | 30 |

TABLE 1-continued

| No. | Base Material | U1 | U2 | A1 | A2 | A3 | OK-412 |
|---|---|---|---|---|---|---|---|
| Embodiment E6 | ABS sheet | 100 | 0 | 0 | 20 | 0 | 30 |
| Embodiment E7 | " | 0 | 100 | 20 | 0 | 0 | 40 |
| Embodiment E8 | " | 0 | 100 | 0 | 20 | 0 | 40 |
| Embodiment E9 | PVC leather | 100 | 0 | 0 | 0 | 20 | 30 |
| Control C1 | " | 100 | 0 | 0 | 0 | 0 | 30 |
| " C2 | " | 100 | 0 | 60 | 0 | 0 | 30 |
| " C3 | " | 100 | 0 | 20 | 0 | 0 | 0 |
| " C4 | " | 100 | 0 | 20 | 0 | 0 | 60 |

TABLE 2

| No. | Waxiness | Scratch Mark | Finger Mark | Tackiness | Darkness | Scott's Abrasion | White Fold | Suede Touch |
|---|---|---|---|---|---|---|---|---|
| E1 | A | none | none | none | A | 5 | none | A |
| E2 | A | " | " | " | A | 5 | " | A |
| E3 | A | " | " | " | A | 5 | " | A |
| E4 | A | " | " | " | A | 5 | " | A |
| E5 | A | " | " | " | A | 5-4 | " | A |
| E6 | A | " | " | " | A | 5-4 | " | A |
| E7 | A | " | " | " | A | 5-4 | " | A |
| E8 | A | " | " | " | A | 5-4 | " | A |
| E9 | A | " | " | " | A | 5 | " | A |
| C1 | C | large | little | " | C | 5-4 | " | C |
| C2 | A | none | none | " | A | 3 | " | A |
| C3 | B | little | large | little | A | 3 | " | B |
| C4 | C | large | none | none | C | 2-3 | large | A |

In the column of "Waxiness" of Table 2, symbol "A" shows a gentle touch closely remebling the touch of natural leather, "B" shows a little lack of the gentle touch and "C" shows lack of the gentle touch. In the column of "Darkness", symbol "A" shows sufficient darkness and "C" shows lack of darkness. In the column of "Suede touch", symbol "A" shows close resemblance to natural leather, "B" shows a little resemblance to natural leather and "C" shows lack of the feel of natural leather. "Scott's Abrasion" gives class values evaluated by a UF rubber tester which is a Scott's abrasion tester manufactured by Ueshima Seisakusho Co. at a testing condition of 1 kg×1,000 times×25° C.

As will be obvious from the above tables, the control C2 containing excesive amount of powdered polyamino acid resin is low in mar resistance and the control C1 containing zero amount thereof is not only poor in waxiness, anti-scratch strength and pitch-darkness, but also almost lacking in the touch of suede. In contrast, all the embodiments of this invention not only exhibit significant improvement in waxiness, anti-scratch strength, finger mark and tackiness to fully attain the aforementioned object, but also are excellent in the touch of suede, pitch-darkness, mar resistance and anti-whitening property.

EMBODIMENTS E10-E19

100 parts by weight of the above-mentioned resin U3 containing polyurethane as its main ingredinet and 100 parts by weight of commercially available resin mixture solution U4 of acrylate resin and vinyl chloride resin manufactured by Seikoh Chemicals Co. (tradename "Luckskin 301") were mixed respectively mixed with the above-mentioned powdered polyamino acid resins A2, A4, A5 and A6 of specified parts by weight as shown in Table 3 to form thirteen kinds of compositions. Each composition was applied onto a releasing paper by a roll coater, dried at 80° C. for five minutes and at 120° C. for 30 minutes to obtain resin coating specimens having a thickness of 30 microns for ten embodiments and three controls as shown. These specimens were measured their frictional coefficients indicative of surface slipperiness and tensile strength (maximum stress by kg/cm2) and tested for their touch and a result was obtained as shown in Table 3. As will be obvious from the table, all of the embodiments have exhibited satisfactory result, though the control C5 containing an excessive amount of polyamino acid resin is lacking in tensile strength and the controls 6 and 7 containing no polyamino acid resin are poor in slipperiness and touch.

TABLE 3

| | No. | Resin | A2 | A4 | A5 | A6 | Slipperiness | Tensile Strength | Touch |
|---|---|---|---|---|---|---|---|---|---|
| Embodiment | E10 | U3 | 10 | 0 | 0 | 0 | 1.00 | 500 | dry |
| " | E11 | " | 20 | 0 | 0 | 0 | 0.89 | 430 | " |
| " | E12 | " | 0 | 5 | 5 | 0 | 0.98 | 500 | " |
| " | E13 | " | 5 | 5 | 5 | 0 | 0.93 | 480 | " |
| " | E14 | " | 0 | 0 | 0 | 15 | 0.94 | 480 | " |
| " | E15 | U4 | 20 | 0 | 0 | 0 | 0.80 | 400 | " |
| " | E16 | " | 0 | 20 | 0 | 0 | 0.76 | 400 | " |
| " | E17 | " | 0 | 0 | 20 | 0 | 0.77 | 400 | " |
| " | E18 | " | 0 | 0 | 0 | 20 | 0.88 | 400 | " |
| " | E19 | " | 35 | 0 | 0 | 0 | 0.60 | 350 | " |
| Control | C5 | " | 50 | 0 | 0 | 0 | 0.40 | 200 | " |
| " | C6 | U3 | 0 | 0 | 0 | 0 | >4 | 580 | tacky |
| " | C7 | U4 | 0 | 0 | 0 | 0 | >4 | 450 | " |

EMBODIMENT E20

200 parts by weight of the above-mentioned resin U3 was diluted with 50 parts by weight of toluene and 50 parts by weight of MEK and warmed up to 30° C. and 17 parts by weight of MG-NCA was added and dissolved therein. Thereafter, 80% hydrazine hydrate of 1/50 mol with respect to the MG-NCA was added thereto and caused to react at 30° C. for three hours and at 50° C. for one hour. The resultant polyurethane resin solution containing fine particles of PMG was processed into a film and the film was evaluated, in the same manner as the embodiments E10 to E19. The result showed a frictional coefficient of 1.26 and a tensile strength (maximum stress) of 470 kg/cm$^2$, which were comparable to the embodiment E11 containing powdered PMG.

EMBODIMENT E21

200 parts by weight of the above-mentioned resin U3 was diluted with 100 parts by weight of ethyl acetate and 100 parts by weight of MEK and warmed up to 30° C. and 4.8 parts by weight of MG-NCA, 2.5 parts by weight of Phe-NCA and 4.7 parts by weight of Leu-NCA were added and dissolved therein. Thereafter, diethanol amine and tributyl amine having molar ratios of 1/500 and 1/100, respectively, with respect to the total molar number of the amino acid NCA were added therein at the same time and polimerized at 30° C. for three hours and at 50° C. for one hour. The resultant polyurethane resin solution containing fine particles of composite polyamino acid resin dispersed therein was processed into a film and the film was evaluated, in the same manner as the embodiments E10 to E19. Similar values to those of the embodiment E14 were obtained.

The above embodiments are provided for explanatory purpose only and do not limit the range of the invention. It should be understood by those skilled in the art that various modifications and changes can be made in these embodiments within the scope of the invention as defined in the appended claims. For example, polyisocyanates can be added in the inventive compositions, as occasion demands, so long as its pot life and workability permit, to improve strength of the coating.

We claim:

1. A resin composition comprising 100 parts by weight of synthetic resin containing polyurethane as a main ingredient thereof, said synthetic resin being dissolved in an organic solvent to form a solution, 5 to 50 parts by weight of powdered polyamino acid resin, and 30 to 40 parts by weight of silica, said powdered polyamino acid resin and said silica being dispersed in said solution.

2. A resin composition as set forth in claim 1, wherein said powdered polyamino acid resin consists of neutral amino acid ω-alkyl ester.

3. A resin composition as set forth in claim 1, wherein said powdered polyamino acid resin consists of neutral amino acid.

4. A resin composition as set forth in claim 1, wherein said powdered polyamino acid resin consists of one or more kinds of acidic amino acid ω-alkyl ester and neutral amino acid.

5. The resin composition of claim 1, wherein said synthetic resin is selected from the group consisting of a polyurethane resin, a polyurethane amino acid copolymer resin, a polyurethane acrylate copolymer resin, a polyurethane urea copolymer resin and mixtures thereof.

6. The resin composition of claim 5, wherein said polyurethane resin is prepared by reacting a polyalkylene ether glycol having a molecular weight from 400 to 5,000, a polyesterpolyol, poly-ε-caprolactone-polyol, polycarbonatediol or a mixture thereof with an organic diisocyanate having hydrogen radicals at the ends thereof.

7. The resin composition of claim 2, wherein said acidic amino acid ω-alkyl ester is prepared by polymerization of an acidic amino acid ω-alkyl ester N-carboxy anhydride of the formula (I):

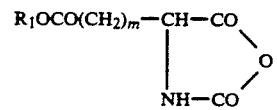

where R$_1$ is an alkyl radical of from 1 to 4 carbon atoms or is a benzyl radical, and m is 1 or 2.

8. The resin composition of claim 7, wherein said powdered polyamino acid resin is prepared by polymerizing said acidic amino acid ω-alkyl ester N-carboxy anhydride in a solution of said synthetic resin.

9. The resin composition of claim 3, wherein said neutral amino acid is prepared by polymerization of a neutral amino acid N-carboxy anhydride of the formula (II):

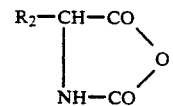

wherein R$_2$ is an alkyl radical of from 3 to 8 carbon atoms, a benzyl radical or a CH$_3$SCH$_2$—CH$_2$— radical, and mixtures thereof.

10. The resin composition of claim 4, wherein said polyamino acid resin is prepared by polymerizing one or more acidic amino acid ω-alkyl ester N-carboxy anhydrides of the formula (I):

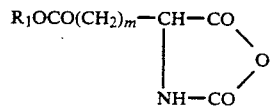

where R$_1$ is an alkyl radical of from 1 to 4 carbon atoms or is a benzyl radical, and m is 1 to 2, and one or more neutral amino acid N-carboxy anhydrides of the formula (II):

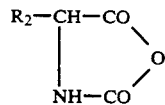

wherein R$_2$ is an alkyl radical of from 3 to 8 carbon atoms, a benzyl radical or a CH$_3$SCH$_2$—CH$_2$— radical, and mixtures thereof.

* * * * *

UNITED STATES PATENT AND TRADEMARK OFFICE
CERTIFICATE OF CORRECTION

PATENT NO. : 5,258,446
DATED : November 2, 1993
INVENTOR(S) : Masao Enomoto et al.

It is certified that error appears in the above-identified patent and that said Letters Patent is hereby corrected as shown below:

Claim 2, line 2 (column 9, line 47), change "neutral" to --acidic--.

Signed and Sealed this

Seventeenth Day of May, 1994

Attest:

BRUCE LEHMAN

Attesting Officer        Commissioner of Patents and Trademarks